(12) United States Patent
Jolliffe et al.

(10) Patent No.: US 9,808,677 B2
(45) Date of Patent: Nov. 7, 2017

(54) BALL GAME APPARATUS

(71) Applicants: David Victor Jolliffe, Watford (GB); Steven Paul Jolliffe, Watford (GB)

(72) Inventors: David Victor Jolliffe, Watford (GB); Steven Paul Jolliffe, Watford (GB)

(73) Assignee: WORLD GOLF SYSTEMS LIMITED, Watford, Hertz (GB)

( * ) Notice: Subject to any disclaimer, the term of this patent is extended or adjusted under 35 U.S.C. 154(b) by 189 days.

(21) Appl. No.: 14/395,024

(22) PCT Filed: Apr. 18, 2013

(86) PCT No.: PCT/GB2013/050979
§ 371 (c)(1),
(2) Date: Oct. 16, 2014

(87) PCT Pub. No.: WO2013/156778
PCT Pub. Date: Oct. 24, 2013

(65) Prior Publication Data
US 2015/0072811 A1 Mar. 12, 2015

(30) Foreign Application Priority Data
Apr. 18, 2012 (GB) .................................. 1206827.6

(51) Int. Cl.
*A63B 43/00* (2006.01)
*G09B 19/00* (2006.01)
*A63B 71/06* (2006.01)

(52) U.S. Cl.
CPC .......... *A63B 43/00* (2013.01); *A63B 71/0619* (2013.01); *G09B 19/0038* (2013.01)

(58) Field of Classification Search
CPC ................................. A63B 43/00; A63B 71/06
See application file for complete search history.

(56) References Cited

U.S. PATENT DOCUMENTS

| 4,528,548 | A |   | 7/1985 | Oberan |
| 5,342,053 | A | * | 8/1994 | Smith .................... A63B 63/00 473/155 |

(Continued)

FOREIGN PATENT DOCUMENTS

| JP | S60-199474 A | 10/1985 |
| JP | 62-062073 | 3/1987 |

(Continued)

OTHER PUBLICATIONS

International Search Report in co-pending, related PCT Application No. PCT/GB2013/050979, dated Sep. 17, 2013.

*Primary Examiner* — Michael Dennis
(74) *Attorney, Agent, or Firm* — Thomas | Horstemeyer, LLP

(57) ABSTRACT

A ball game apparatus comprises a control device (14, 24, 52, 60) which defines a predetermined range of allowable movements of a ball (10, 20, 40, 70) over space and time, sensing means (12, 22, 42) for detecting the actual movements of a ball, comparison means for comparing an actual movement to the predetermined range of allowable movements, and indicating means (16, 34, 54, 62) for indicating the output of the said comparing. The sensing means (12, 22, 42) comprises a multi-axis accelerometer contained in the ball and having accelerometer, gyroscope and/or magnetometer functions. The ball may be activated by an internal magnetically-operated switch (17, 22, 47). The control device and indicating means can be incorporated in the ball itself or in a separate portable computing device.

11 Claims, 2 Drawing Sheets

(56) References Cited

U.S. PATENT DOCUMENTS

| | | | | |
|---|---|---|---|---|
| 5,582,550 A | * | 12/1996 | Foley | A63B 24/0021 |
| | | | | 473/153 |
| 8,905,855 B2 | * | 12/2014 | Fitzpatrick | G06T 13/40 |
| | | | | 473/199 |
| 2002/0091017 A1 | | 7/2002 | Kuesters | |
| 2007/0026968 A1 | | 2/2007 | Ratcliffe | |
| 2009/0280920 A1 | | 11/2009 | Rankin | |
| 2010/0069181 A1 | | 3/2010 | Lin | |
| 2010/0285903 A1 | | 11/2010 | Nicodem | |
| 2011/0159977 A1 | | 6/2011 | Plez | |
| 2011/0237367 A1 | | 9/2011 | Kodama et al. | |
| 2011/0304497 A1 | | 12/2011 | Molyneux et al. | |
| 2012/0052971 A1 | | 3/2012 | Bentley | |
| 2013/0274040 A1 | * | 10/2013 | Coza | G09B 19/0038 |
| | | | | 473/570 |

FOREIGN PATENT DOCUMENTS

| | | |
|---|---|---|
| JP | H11-244422 A | 9/1999 |
| JP | 2001-65623 A | 3/2001 |
| JP | 2007538255 | 12/2007 |
| JP | 2011-224284 A | 11/2011 |
| WO | 2005/028035 A1 | 3/2005 |
| WO | 2005/116944 A2 | 12/2005 |
| WO | 2010/016349 A1 | 2/2010 |
| WO | 2010065886 A1 | 6/2010 |
| WO | 2011/057194 A1 | 5/2011 |

* cited by examiner

BALL GAME APPARATUS

CROSS-REFERENCE TO RELATED APPLICATION

This application is the 35 U.S.C. §371 national stage of, and claims priority to and the benefit of, PCT application PCT/GB2013/050979, filed Apr. 18, 2013, which claims priority to and the benefit of GB Application No. 1206827.6, filed on Apr. 18, 2012, herein incorporated by reference in their entireties.

The present invention relates to a ball game apparatus and to a method of playing a ball game in which the motion of a ball is detected and an indication of the player's score is given. An indication may also be given if the motion of the ball does not comply with the rules of the game.

U.S. Pat. No. 7,040,998 discloses a golfing game with means for automatically monitoring the movement of the ball in order to enable the number of strokes taken by a player to be counted.

International Patent Application WO 2009/130474 discloses a golfing game apparatus incorporating ball motion detecting means comprising photoelectronic beams and cameras.

International Patent Application WO 2005/028035 discloses a golfing game in which, for scoring purposes, each ball contains means which communicate with devices arranged around a golf course.

WO 1997/01376 discloses a golf green monitored by a surveillance camera and a motion sensor for detecting balls.

U.S. Pat. No. 5,860,648 discloses an electronic putting apparatus in which, for scoring purposes, the position of a ball is monitored by a video camera.

The above-described systems do not always provide sufficient accuracy and reliability for commercial use. The systems are not sensitive and/or intelligent enough to reliably know whether the ball was picked up and moved or perhaps dragged into the hole, or carried into the hole, or dropped, or hit by another ball etc. Accordingly, the ball might detect that it has been 'hit' multiple times when it has not. Moreover, in some systems, the ball does not give out any information unless it is on the tee or in the hole. Therefore, when a player hits the ball and it does not go into the hole, no information is available to update the score until it finally reaches the hole, probably after several hits.

Aspects of the present invention seek to provide an improved ball game apparatus. In particular they seek to cater for all types of event which can occur in practice and to indicate a player's final score for the game. They also seek to provide apparatus which can quickly indicate the current state of the game to players.

According to a first aspect of the present invention, there is provided a ball game apparatus comprising a control device which defines a predetermined range of allowable movements of a ball over space and time, sensing means for detecting the actual movements of a ball, comparison means for comparing an actual movement to the predetermined range of allowable movements, and indicating means for indicating the output of the said comparing.

In particular, the comparison means can determine whether a certain event has occurred by comparing an actual movement to the predetermined range of allowable movements. For example, in a golf game it can be determined whether a particular hit of a ball constitutes a valid stroke, and it can also be determined whether a particular route has been taken by the ball, and whether/when the ball has entered a hole. It can thus be determined how many strokes have been taken to complete a given hole, and this information can be shown on the indicating means.

The sensing means may be provided in a ball used to play the ball game. In preferred embodiments the sensing means comprises a multi-axis accelerometer, e.g. a three-axis, a six-axis or a nine-axis accelerometer.

In some embodiments, the control device and comparison means are also provided in a ball used to play the game. The control device and comparison means may comprise a micro-computer.

The indicating means additionally may be provided in the ball, such that the output of the comparison means is displayed on the ball itself. This provides a particularly compact game apparatus requiring little or no external equipment.

The indicating means may comprise a light emitting diode (LED) display.

Alternatively, the indicating means may be provided in a remote device, the ball being provided with a transmitter for communicating the output of the comparison means to a receiver located in the remote device. The output of the comparison means is then displayed on the remote device. This provides a particularly convenient arrangement for presenting the current state of the game.

In alternative embodiments, the control device and comparison means are also provided in a remote device, the ball being provided with a transmitter for communicating the output of the sensing means to a receiver located in the remote device. The output of the sensing means is then communicated to the comparison means and the output of the comparison means is displayed on the remote device.

In preferred embodiments, the transmitter and the receiver communicate via a wireless personal area network (WPAN), such as Bluetooth®.

The control device and the indicating means may be part of a portable computing device. The portable computing device may comprise a player's personal hand held computing device, such as a mobile phone, PDA or tablet computer running an application which provides the necessary control device, comparison means and/or indicating means. Alternatively, the remote device may be a dedicated device running software to provide the necessary control device, comparison means and/or indicating means.

In those embodiments in which data is communicated from a ball to a remote device, the balls used are preferably coded so that the code of the ball can be communicated together with the required data.

In order to determine whether a particular route has been taken by the ball, the sensing means may comprise a magnetometer, or compass device (which constitutes three of the axes of a multi-axis accelerometer contained within the ball) and a magnet or series of magnets placed along the possible route or routes. In addition to being provided around a golf course itself, one or more magnets may be provided in a reception area of the golf course. In this way, the magnetometer can detect when the ball has passed a magnet or series of magnets and can communicate this information to the micro-computer where it can be processed accordingly.

In a preferred embodiment the accelerometer comprises a three-axis piezoelectric, surface acoustic wave, electromechanical, strain gauge, magnetic induction or optical accelerometer device, a three-axis gyroscope and a three-axis magnetometer. The use of different functions in the sensing means provides a sensitive and accurate arrangement.

According to a second aspect of the present invention there is provided a golf facility comprising an apparatus according to the first aspect, a plurality of balls each having a unique code, and a reception area with a device arranged to allocate a particular ball to a particular player.

The indicating means, or at least a part thereof, is preferably located in the reception area.

A plurality of magnets may be distributed around the golf facility. This enables a precise determination of the location of balls using magnetic sensing techniques. A magnet may be provided in the reception area for switching on a magnetically-operated switch in the balls.

At different locations around the facility, the magnets can be arranged in different patterns and/or can have different strengths. This enables the comparison means to discriminate between different parts of a golfing course.

According to a third aspect of the present invention, there is provided a ball comprising a control device which defines a predetermined range of allowable movements of the ball over space and time, sensing means for detecting the actual movements of the ball, comparison means for comparing an actual movement to the predetermined range of allowable movements, and indicating means for indicating the output of the said comparing.

The ball may be switched on by a magnetically-operated switch therein, e.g. a Hall effect device. This provides a simple way of activating the ball by bringing it into proximity with a magnet. Switching off a ball after use can be readily effected by the control device.

The present invention also provides a method of playing a game such as golf employing an apparatus, facility or ball according to the first, second and third aspects respectively.

Preferred embodiments of the present invention will now be described, by way of example only, with reference to the accompanying drawings, of which:

Figure 1:
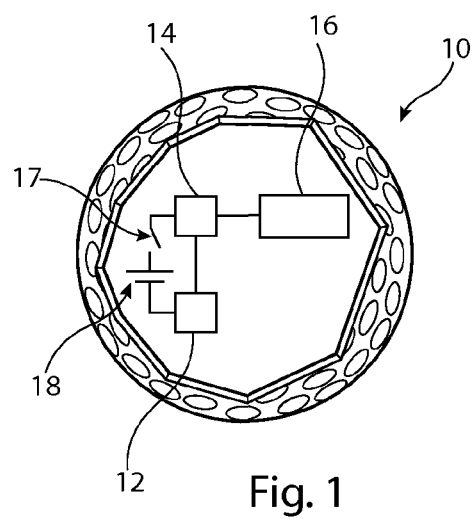
FIG. 1 is a schematic diagram showing the circuitry contained within a ball used in an embodiment of the present invention.

Referring to FIG. 1, a golf ball 10 in accordance with an embodiment of the present invention comprises a multi-axis accelerometer 12, in particular a nine-axis accelerometer, which monitors each phase of the motion of the golf ball and supplies data to a micro-computer 14. The accelerometer is a three-axis accelerometer combined with a three-axis gyroscope and a magnetometer or compass also having three sensing axes. Data from an output of the micro-computer 14 is communicated to a display 16, which may comprise a series of light emitting diodes (LEDs) or any other suitable display means. At least a part of the ball's surface is transparent such that the display can be read.

The components 12, 14, 16 inside the ball are powered by an internal battery 18. The components are switched on by a Hall effect switch 17 which is switched on by the proximity of the strong magnet field.

During play, the multi-axis accelerometer 12 in the ball 10 detects the impact of a golf club and the subsequent movement of the ball until it comes to rest. The output of the accelerometer is communicated to the micro-computer 14 which registers that one stroke has been taken.

Thereafter play continues, with the micro-computer 14 registering when each shot has been taken, until the ball has entered a hole on the course. The entry of a ball into a hole is detected by the micro-computer 14 as a predetermined sequence of movements of the ball in space and time. In this regard, the micro-computer 14 will determine that the ball has entered a hole when a particular sequence of events is registered. For example, the ball will roll after the stroke has been played and before the hole is reached. Then, after the ball reaches the edge of the hole, the ball will drop a distance into the hole, with the distance being between predetermined upper and lower limits. The micro-computer will then detect an impact as the ball hits the bottom of the cup, and this will be followed by a series of smaller impacts of decreasing magnitude as the ball bounces in the hole. The ball will then rest until it is removed from the hole by the player.

Of course, other sequences of events could signify that a ball has entered a hole. These will be known to the skilled person and may be dependent upon the particular hole being played.

The system is therefore able to detect that a ball has entered a hole simply by analysing the movement of the ball from the data that is processed from the accelerometer (i.e. the "movement signature" of the ball). In this regard, no sensors in the hole are required.

The number of strokes taken to complete the hole is indicated on the display 16, for example by the display showing the appropriate number. The display may also indicate the number of strokes taken up to the present time as play progresses. When play has finished, the components inside the ball are switched off, e.g. under the control of micro-computer 14.

This arrangement can be used to enhance the players' experience at any golf or putting course without the need for any installation costs, other than the cost of the balls themselves. There is no requirement for a computer system, or any screens, sensors, cameras, communication devices etc., to be installed at the course or carried by the player.

Figure 2:
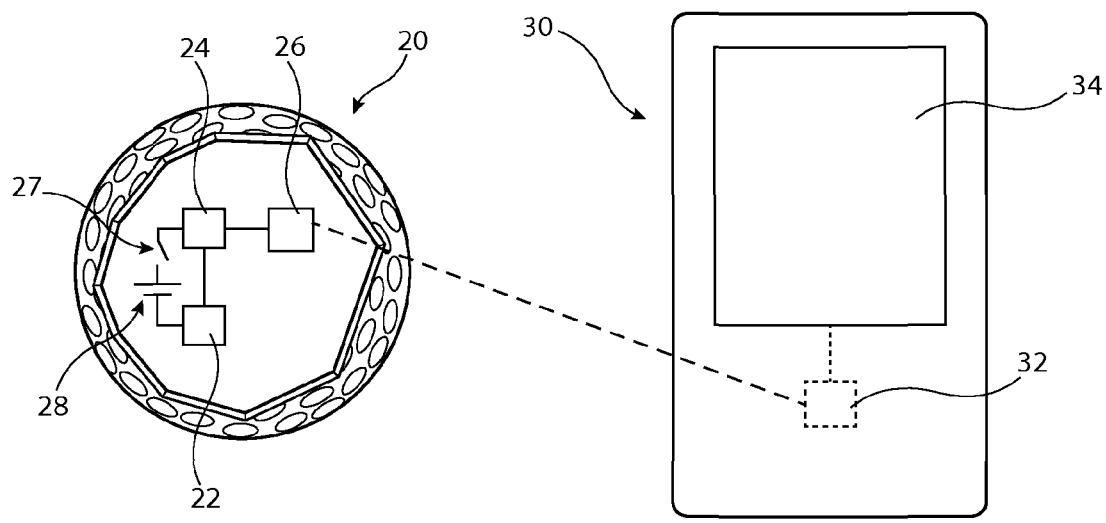
FIG. 2 is a schematic diagram showing the circuitry contained within a ball and within a remote device used in an alternative embodiment of the present invention.

Referring now to FIG. 2, apparatus in accordance with another embodiment of the present invention comprises a golf ball 20 in which a multi-axis accelerometer 22, which is structurally and functionally similar to the accelerometer 12 of golf ball 10, supplies data to a micro-computer 24. The micro-computer 24 is connected to a Bluetooth transmitter 26. The components 22, 24, 26, inside the ball 10 are powered by an internal battery 28. The components are switched on by a magnetically-activated Hall effect switch 27. Also provided in this embodiment is a remote device 30 which comprises a Bluetooth receiver 32 and a display 34.

During play, the accelerometer 22 in the ball 20 detects the impact of a golf club and subsequent movement of the ball until it comes to rest. The output of the accelerometer is communicated to the micro-computer 24 which registers that one stroke has been taken.

Thereafter play continues, with the micro-computer 24 registering when each shot has been taken, until the ball has entered a hole on the course. The entry of a ball into a hole is detected as described above.

The output from the micro-computer 24, that is data relating to the number of strokes taken and whether the hole has been completed, is transmitted via a Bluetooth link (shown by a dashed line in FIG. 2) from the transmitter 26 in the ball 20 to the receiver 32 in the remote device 30. This data is then indicated on the display 34 of the remote device 30. Therefore, the number of strokes taken to complete a hole is indicated on the display 34, for example by the display showing the appropriate number. The display may also indicate the number of strokes taken up to the present time as play progresses. This information can be displayed in the form of a score card, with the additional display of relevant statistics, graphics etc.

Alternatively, the remote device can be located in the reception area of a golfing facility, with the score card, statistics, graphics etc. being displayed in reception and/or printed out at the end of the game. The score card, statistics, graphics etc. can also be accessed over the Internet.

Figure 3:
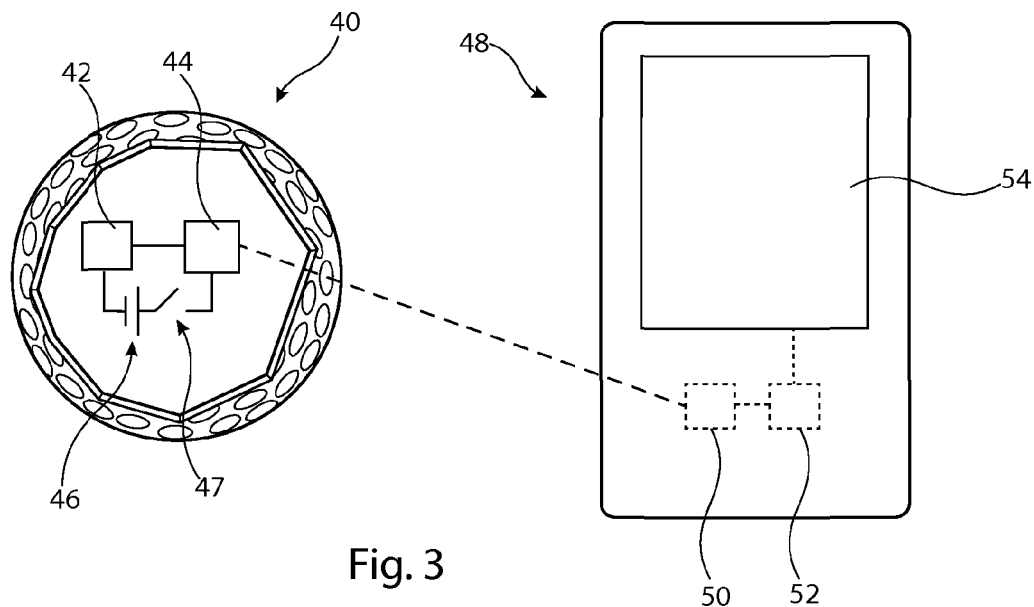
FIG. 3 is a schematic diagram showing the circuitry contained within a ball and within a remote device used in a further alternative embodiment of the present invention.

Referring now to FIG. 3, apparatus in accordance with a further embodiment of the present invention comprises a golf ball 40 in which a multi-axis accelerometer 42, which is structurally and functionally similar to the accelerometers 12 and 22 of golf balls 10 and 20 respectively, is housed. The ball 40 also contains a Bluetooth transmitter device 44. The components 42, 44 inside the ball 40 are powered by an internal battery 46. The components are switched on by a Hall-effect switch 47. Also provided in this embodiment is a remote device 48 which comprises a Bluetooth receiver 50 connected to a micro-computer 52. The micro-computer 52 is connected to a display 54.

During play, the accelerometer 42 in the ball 40 detects the impact of a golf club and subsequent movement of the ball until it comes to rest. The output of the accelerometer is transmitted via a Bluetooth link (shown by a dashed line in FIG. 3) from the transmitter 44 in the ball 40 to the receiver 50 in the remote device 48 and then on to the micro-computer 52 which registers that one stroke has been taken.

Thereafter play continues, with the micro-computer 52 registering when each shot has been taken, until the ball has entered a hole on the course. The entry of a ball into a hole is detected as described above.

In this way, the number of strokes taken to complete a hole is indicated on the display 54, for example by the display showing the appropriate number. The display 54 may also indicate the number of strokes taken up to the present time as play progresses. This information can be displayed in the form of a score card, with the additional display of relevant statistics, graphics etc.

Alternatively, the remote device can be located in the reception area of a golfing facility, with the score card, statistics, graphics etc. being displayed in reception and/or printed out at the end of the game. The score card, statistics, graphics etc. can also be accessed over the Internet.

The remote device used in the embodiments described above with reference to FIGS. 2 and 3 could be a player's smart phone, PDA or tablet computer for example, having Bluetooth capability and upon which a dedicated application is loaded. The application functions to enable the device to communicate with the transmitter 26, 44 in the ball 20, 40 via Bluetooth using the device's Bluetooth receiver, and to enable the device's display to indicate the necessary data. As an alternative, the remote device may be a dedicated device having a Bluetooth receiver and a suitable display, and running software to provide the necessary functionality. In this regard, a device which is carried by a player will generally be in the range of the Bluetooth transmitter when the ball is about to be hit or is being picked out of a hole.

The ball and the device are paired in that a unique code is stored by the micro-computer 24, and the Bluetooth transmitter device 44 such that data output from the ball 20, 40 contains this code, with the remote device accepting only data which has been coded using that unique code.

The embodiments described herein allow a player simply to keep a record of the number of strokes taken to complete a hole. No additional equipment is needed; the ball 10, 20, 40 is simply used in place of a regular golf ball and the score is indicated either on the display 16 of the ball 10, or on the display 34, 54 of the remote device 30, 48. The ball 20 can be used on any golf hole, for example those found on putting greens and putting courses including mini golf, crazy golf, putt putt, adventure golf.

Embodiments of the invention can be used on a practice putting green, which typically does not have a receptionist to distribute balls. In this case a player uses his own ball and a mobile phone loaded with a suitable application. Additionally, the ball 20 can be used on a hole set up by a player at home, in the garden or in an office, in which case the remote device may be a household games console, such as the Nintendo® Wii®. The application counts and displays the number of hits.

In addition to the above-described functions, the micro-computer 14, 24, 52 can accurately count the total number of strokes by detecting whether each stroke is valid or not. A valid stroke involves a certain amount of acceleration and deceleration plus specific movements of the ball that are required for a specific shot. For example, a player must not pick up the ball, drag the ball, or roll the ball by hand. If a ball hits another ball, this is detected so that the player whose ball has been hit by another ball is not unfairly penalised.

As described above, the apparatus of the present invention can be used on any golf hole to allow a player to keep a record of the number of strokes taken to complete a hole in a simple manner.

A typical game to be played at a golfing facility using the apparatus of the present invention will now be described. A player arrives at the reception area of such a facility, where a ball is hired to the player (for a fee) for a set number of rounds. The ball is placed near a magnet to switch on the switch 17, 27, 47. Simultaneously or subsequently, the ball is placed within range of a Bluetooth enabled computer in reception to allocate the ball to the player. The player's details are registered in one of several ways. A receptionist at the facility can enter the name of the player, and preferably a mobile phone number and email address, into the computer. Alternatively the player can register their name and contact details on-line, via the application running on the remote device, or at a kiosk. Only one of a group of players needs a compatible mobile device if they want to see the scores for their group, as they move around the course. If none of the players have a compatible mobile device they are still able to play the game, they just will not see the scores until they go to reception to get a print out or see a screen showing scores and leader board.

The apparatus of FIGS. 2 and 3 can also be used in conjunction with dedicated facilities, which would have a reception area for registering players, assigning them a ball with a unique code stamp and providing information relating to the unique code to the remote device to be used by that player. Players can then play the game using their assigned ball. Such a dedicated facility may alternatively have computers and screens at each hole such that the output from the accelerometer in the ball can be communicated to the computers and the data can be displayed on the relevant screens.

Figure 4:
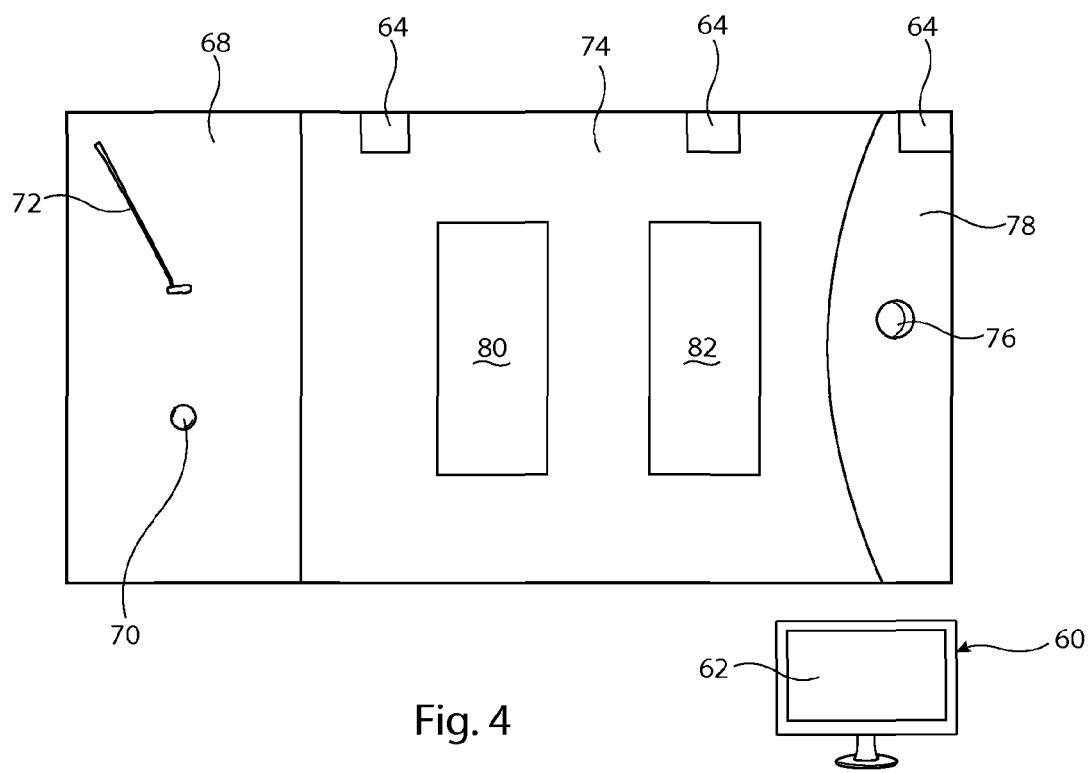
FIG. 4 is a top schematic view showing the layout of a golfing game in accordance with an aspect of the present invention.

Such an arrangement is shown in FIG. 4. In this arrangement, either the golf ball 20 described herein above with reference to FIG. 2 or the golf ball 40 described herein above with reference to FIG. 3 is used. The ball in FIG. 4 is denoted by the reference numeral 70. The game is played on a course having Bluetooth enabled computers 60 and screens 62 associated with each hole. Computers 60 include a micro-computer providing a control device and comparison means, thus enabling the game to be played without the use of a hand held device. Instead, the functionality provided by the hand held device in the previous embodiment is provided by the Bluetooth enabled computers 60 and the screens 62. The screens 62 can display additional information, for example providing a leader board for a particular group of players. Additionally, there may be one or more video cameras 64 monitoring each hole. If, as a result of the motion of the ball 70 detected by the computer 60, there is doubt as to whether a valid hit with a putter or other golf club has been performed, the real time video output of one of the cameras 64 is used to resolve this.

A typical game to be played at such a dedicated facility will now be described. A player arrives at the reception area of the facility and receives a coded ball, which is hired to a player for predetermined set of holes. The ball is switched on as described above and the identity of the player is assigned to the ball. This can be done in one of a number of ways. For example the name and contact details of the player may be entered by a receptionist. Alternatively, a console may be provided, e.g. in a kiosk, at which the player may enter the required details. During this process the code identifying the ball is registered, e.g. by means of a ball reader associated with a central computer. The central computer is linked to a respective computer 60 at each hole around the golf course by means of a communications device.

The player then proceeds to the golfing game, which is typically the first hole of an eighteen hole golfing facility. The player then places ball on the tee in the tee area 68. The player proceeds to strike the ball 70 with putter 72 over playing area 74 towards hole 76 on a green 78.

During play, the computer 60 registers when each shot has been taken until the ball has entered a hole on the course, as described above. In this way, the number of strokes taken to complete a hole is indicated on the screen 62, for example by the screen showing the appropriate number. The screen may also indicate the number of strokes taken up to the present time as play progresses, and may provide this information for a number of players playing the game in a group. Each computer 60 is linked back to the central computer, such that a player's scorecard can be printed out when that player has completed all the holes at the facility. At the end of the game, the computer software is configured to switch off the balls.

Between the tee area 68 and the green 78, the playing area 74 comprises a plurality of obstacles or other features 80, 82 etc. such as a variety of chicanes, hills, moving rivers, waterfalls, winding paths, trees, mountains, tunnels, lakes with "islands", bridges etc.

A valid golf shot for a specific hole has a "movement signature" of information that the system can ascertain is valid or not. For example, if the hole is 50 meters long, and the ball gets to the hole in thirty seconds, with very little force or acceleration and a low or zero spin rate is detected, it is not a valid shot. Similarly, if the ball needs to roll up a hill and then roll down a hill, the apparatus is able to ascertain whether this has happened correctly, within the parameters expected. For example, if the force required to get up the hill is 3 g, then a detected force of 2 g means that the ball will not reach the summit so will roll back down the hill to be hit again. Alternatively, if significantly more than 3 g is measured, this will not result in a successful shot, so the ball should not end up in the hole without at least one more valid shot. For example, if the ball needs to go along a moving river to get to the hole, the apparatus needs to know this as the "movement signature" of a ball moving in a river is completely different from a ball rolling along a putting green. Similarly, a ball might end up onto a moving part of the course such as a water wheel or roundabout whereby the ball is not rolling (stops spinning) for a time or perhaps falls off a cliff (not rolling or spinning normally) and bounces several times. All this is accurately measured, leading to an attractive sophisticated game.

An advantage of the above-described embodiments is that the apparatus detects not only that the ball is moving but also how it is moving. A particular advantage is that the apparatus can detect when the ball has entered a hole. In preferred embodiments this is achieved without any fixed detector in or immediately adjacent to the hole. However, for increased security, a detector device such as a photoelectric beam arrangement can be provided in the hole to detect the passage of a ball.

The advantage of using a multi-axis accelerometer is that it quickly measures changes in speed and direction. The multi-axis accelerometer measures how much the ball is accelerating, decelerating, going up, going down etc. The apparatus recognises a valid shot by interrogating the data and calculating exactly what the ball is doing with regard to movement. Every time a ball moves, a "movement signature" is ascertained and compared in the hand held device with pre-measured "movement signatures" and the apparatus decides what has happened to the ball. Accordingly, if a player drops the ball, the apparatus knows that it was not a golf shot.

In addition to the above, a golf hole comprising obstacles may provide several routes to the hole and the rules of the game may award a different number of points to a player depending on the route taken to reach the hole. It is thus advantageous for the apparatus to be able to detect which route has been taken by a ball so that an appropriate number of points can be awarded to the player. A number of light beams, switches or the like can be used at appropriate locations on the hazards so as to enable such detection.

In all the above-described arrangements, the accelometer's three-axis magnetometer (to the extent that it is employed) interacts with the Earth's magnetic field to detect the direction of travel of the ball. Preferably though, a magnet or series of magnets are placed at strategic points along the course, following the possible routes that can be taken by a ball between the tee and the hole, for example different paths, tunnels or pipes. Here, the magnetometer detects the strength and direction of the magnet field produced by the magnet or magnets, and communicates this information to the micro-computer. The system can then use this information to detect the route a ball has taken and its position, and to award an appropriate number of points to the player. In addition, one or more magnets could be located next to or beneath the tee area to allow the system to confirm that the ball is on the tee of a specific hole. The number and/or pattern and/or relative strengths of the magnets can be used to differentiate holes from each other. The system can then compare the movement signature with the expected movements for that specific hole. Such an arrangement is advantageous over systems requiring electronic sensors or readers, as these systems typically require power and a direct link to a computer.

An alternative system for sensing the movements of a ball could utilise the Global Positioning System (GPS). In such a system, a GPS receiver is incorporated into the ball such that position information relating to the ball can be ascertained and communicated to the micro-computer for processing as described above.

Although the above described embodiments utilise a Bluetooth link between the ball and the remote device, any other suitable form of wireless link could be used, for example another form of WPAN.

A magnetometer has been described for detecting the route taken by a ball; however, any other suitable form of detection apparatus may be used, including a Hall effect device.

The apparatus described herein provides a game which is attractive to players. It reliably identifies which player is playing which hole, automatically counts the number of shots and measures skill and accuracy, awards a score per hole and can produce a scorecard. Scores are shown on one or more displays, which may be incorporated into the ball itself. Alternatively, or in addition, the display of a remote device such as a player's mobile phone or a hand held device could be used. Alternatively, or in addition, scores may be shown on screens throughout the course which can include a leader board in reception. The occurrence of unallowable ball movements can also be indicated on the same display(s) as the scores.

The apparatus lends itself to being themed, but the exact theme depends on location and environment.

The rules of the game can be similar to existing Adventure Golf courses where the idea is to get the ball into the hole in as few putts as possible. However, some holes may have targets with target zones where for example a ball will go up a ramp, over a river and into a target which has a "bull's eye" or the like.

When a player makes a significant score or shot, such as a hole in one, special effects can make the occasion dramatic, with sound, graphics and movement of some sort. For example, a dinosaur could roar and move at the same time, if that was the theme at that site.

The scoring system can take into account which route the ball has taken on the way to the hole. For example, one may lose points if it gets in a bunker or down the 'wrong' path. Therefore, the ultimate score can be a total number of points, whereby the more points you get, the better, which is different from traditional golf. For example, the best possible score may be 180,000 points rather than eighteen strokes.

It is possible to allocate the same movement signature, i.e. set of parameters, for each hole on a golf course. The accuracy and sophistication of the apparatus are increased, however, by having a respective movement signature matched to the particular features of each hole.

Depending on the scale of the game and the size of each hole, the game can be played with one or more normal golf clubs in addition to a putter.

The playing surface and the green may be continuous, so that no separate green is provided.

Other types of accelerometer may be used. For example, a six-axis accelerometer can be employed, which omits the features of a compass from the above-described nine-axis accelerometer. A single three-axis accelerometer can be used. The types of accelerometer may be piezoelectric, surface acoustic wave, electromechanical, strain gauge, magnetic induction, or optical e.g. laser accelerometers.

To monitor movements of the ball, just a gyroscope may be employed. Additionally, or instead, a vibration sensor can be used.

An advantage of an accelerometer with a higher number of axes is that it can clarify borderline decisions as to whether a shot is valid.

Although the games described are based around golf, the game may be suitably modified for other ball games or sports such as croquet, snooker, pool, billiards and pinball.

The features and modifications of the various described embodiments can be combined or interchanged as described.

The invention claimed is:

1. A golf facility, comprising:
   a plurality of balls;
   a plurality of holes;
   a control device which defines a predetermined range of allowable movements of the balls over space and time, wherein the predetermined range of allowable movements includes a sequence of translational accelerations and rotational accelerations, wherein the sequence includes a valid sequence of shots for each hole, wherein the predetermined range of allowable movements includes specific movements of a ball to define a movement signature, wherein each hole has a respective movement signature for identifying valid strokes for that hole;
   sensing means for detecting the actual movements of the ball;
   comparison means for comparing an actual movement to the predetermined range of allowable movements; and
   indicating means for indicating the output of the comparing.

2. A golf facility according to claim 1, wherein the plurality of balls each have a unique code.

3. A golf facility according to claim 1, wherein the predetermined range of allowable movements includes the route taken by each ball through the apparatus.

4. A golf facility according to claim 1, comprising a reception area with a device arranged to allocate a particular ball to a particular player.

5. A golf facility according to claim 4, wherein said indicating means, or at least part thereof, is located in the reception area.

6. A golf facility according to claim 4, comprising a plurality of magnets distributed therearound.

7. A golf facility according to claim 6, wherein, at different locations around the facility, the magnets are arranged in different patterns and/or have different strengths.

8. A golf facility according to claim 6, wherein the sensing means is arranged to detect movements of each ball relative to said plurality of magnets.

9. A golf facility according to claim 1, wherein the sensing means comprises a multi-axis accelerometer contained in each ball.

10. A golf facility according to claim 1, wherein the sensing means is a multi-axis accelerometer with a multi-axis gyroscope and/or a multi-axis magnetometer.

11. A golf facility according to claim 1, wherein each ball incorporates a global positioning system (GPS) receiver and the sensing means employs the GPS.

* * * * *